US006950207B1

(12) United States Patent
Saitoh (10) Patent No.: US 6,950,207 B1
(45) Date of Patent: *Sep. 27, 2005

(54) PRINTER SYSTEM AND IMAGE PROCESSING METHOD, AND COMPUTER-READABLE RECORDING MEDIUM WITH A PROGRAM FOR MAKING A COMPUTER EXECUTE THE IMAGE PROCESSING METHOD RECORDED THEREIN

(75) Inventor: Norio Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 711 days.

This patent is subject to a terminal disclaimer.

(21) Appl. No.: 09/579,135

(22) Filed: May 30, 2000

(30) Foreign Application Priority Data

May 31, 1999 (JP) ................................ 11-152908
May 1, 2000 (JP) ............................... 2000-132931

(51) Int. Cl.[7] .......................................... G06K 15/00
(52) U.S. Cl. ........................................ 358/1.9; 358/1.1
(58) Field of Search ................................ 358/1.1, 1.15, 358/1.2, 1.18, 3.13, 3.19, 3.16, 1.9, 1.3

(56) References Cited

U.S. PATENT DOCUMENTS

| 5,301,271 A | * | 4/1994 | Hiratsuka et al. ........... 345/536 |
| 6,100,996 A | * | 8/2000 | Amano et al. ............... 358/1.9 |
| 6,266,152 B1 | * | 7/2001 | Nakajima .................... 358/1.9 |
| 6,542,258 B1 | * | 4/2003 | Garcia et al. ................ 358/1.9 |

* cited by examiner

*Primary Examiner*—Arthur G. Evans
(74) *Attorney, Agent, or Firm*—Oblon, Spivak, McClelland, Maier & Neustadt, P.C.

(57) ABSTRACT

A printer system comprises a printer driver that adds drawing-object information for identifying the type of drawing object to print data that is output to a printer. The printer system further comprises a printer controller that selects dither data matching the drawing object based on the drawing-object information added to the print data, performs dithering on the print data, and expands the data to an image.

22 Claims, 9 Drawing Sheets

PRINTER SYSTEM AND IMAGE PROCESSING METHOD, AND COMPUTER-READABLE RECORDING MEDIUM WITH A PROGRAM FOR MAKING A COMPUTER EXECUTE THE IMAGE PROCESSING METHOD RECORDED THEREIN

FIELD OF THE INVENTION

The present invention relates to a printer system, in which an image formation apparatus such as a laser printer or a digital copying machine and a host computer such as a personal computer are connected to each other through a communication unit, and also relates to an image processing method. More particularly, this invention relates to a printer system and an image processing method which allows a printer controller to easily determine an object and select any dither data appropriate for the object for printing. These printer system and image processing method configured as explained above are realized by adding information for determining an object of drawing data to the drawing data in the side of a printer driver when the drawing data created by an application on a host computer is to be printed. Further, this invention relates to a computer-readable recording medium in which a program for making a computer execute the image processing method is recorded.

BACKGROUND OF THE INVENTION

There has been known a printer system in which a host computer such as a personal computer (PC) or a work station (WS) and a printer such as a laser printer are connected to each other so that intercommunication can be made. In such printer system, when an image is to be output to a printer or a display, pixel data (such as RGB as one of signals to be sent to a color display, or CMYK for color printing) for each color as original data for the image is scanned on the printer or the host computer, and the data is converted to a VRAM (video memory) format line by line. When the image on the basis of the data (drawing data) that has been converted to the VRAM format is to be output by the printer, the drawing data is converted to a printer language to be output to the printer as print data together with a control signal.

When the density level of each color is not 0 (%) or 255 (%), the pixel data is subjected to masking by a pattern corresponding to a color level in the process of converting the data to the video memory format. As the processing of masking, a dither pattern (matrix) represented by a block consisting of 4×4 pixels or 6×6 pixels or so at each color level is used. The masking using the dither pattern is referred to as a dither method. The dither method is a technique for adjusting positions and arrangement of pixels for different colors, and artificially reproducing an intermediate color. According to the dither method, gradations can be reproduced with a smaller number of colors by finely changing a color distribution using two types of colors such as a dark color and a light color.

The dither data used for the dither method is generally designed so as to match an object for drawing (drawing object) such as a photograph and a character. The drawing data created for drawing each object is broadly classified to three types: character data for drawing characters, photograph data for drawing photographs, and graphics data for drawing graphics. The dither data used for drawing each of the data includes data designed for the character data so as to improve reproductivity of thin lines (dither data for characters) and data designed for the photograph data so as to reproduce changes in color densities as naturally as possible.

Conventionally, when each image of the three types of drawing object is drawn using the dither data for characters or the dither data for photographs, one of the dither data is selected. The correlation between the dither data and the drawing objects is as shown in the table 1 explained below.

[Table 1]
1 Drawing object
2 Character
3 Photograph
4 Graphics
5 Dither data to be used
6 Dither data for characters
7 Dither data for photographs However, the conventional method for selecting the dither data as shown above has some problems explained below. A character as drawing data includes one to be sent as an image, other than ordinary character data, like data obtained by rotating a character used in PageMaker (that is typical DTP software provided by Adobe Systems of USA) or the like. In such image data, although the drawing object is a character, it is generally drawn using dither data for photographs. Therefore, if the character is a fine one, it is sometimes hard to be found out. Further, in regard to data for gradation frequently used in PowerPoint (that is presentation software provided by Microsoft Corporation), the data is drawn based on the dither data for characters, therefore, reproductivity of gradation may often be degraded.

In the conventional printer system, when drawing data received from the application is to be sent a printer (or a device), only the data obtained by converting the drawing data to a page description language and a control code are sent to the printer (or the device). Therefore, it is hard for the printer controller to identify the type of drawing data from the data and control code. Hence, dither data matching the type of drawing object is not always selected, thus the dither method optimal to the drawing object may not be executed, which causes degradation in image quality to occur.

A graphic created based on graphics data includes one with a portion of area fill surrounded by a line drawing (area fill) and one with no area fill. In the conventional printer system, the graphics data is subjected to drawing processing using the dither data for characters regardless of presence or absence of area fill in the graphics as shown in table 1.

In the image formed on the basis of the graphics data with area fill, there occurs such inconvenience that reproductivity of gradations in the portion of area fill is degraded. Further, when all the graphics data is subjected to drawing processing using the dither data for photographs in order to resolve the inconvenience, the degree of reproductivity of comparatively thinner lines may be decreased.

In fact, the dither data takes time to design and also requires comparatively larger storage capacity for its storage in the printer system. Therefore, by using respective dither data dedicated to the graphics data with area fill and the graphics data with no area fill, development of the printer system is restricted. This also causes the memory capacity provided in the printer system to be upsized.

Further, the printer system sometimes requires to convert pixel data created by a CAD (Computer Aided Design) application to print data and draw an image based on the print data. The CAD application can create the pixel data for a thin line of a dot 1 pixel wide. Therefore, when an image is drawn based on the pixel data created by the CAD application, the printer system is also required to form an image with higher quality.

SUMMARY OF THE INVENTION

It is an object of this invention to avoid degradation in image quality due to unmatched data between dither data and drawing data. The object is achieved by enabling identification of each type of objects of drawing data that is sent from an application to a printer and also realizing selection of dither data most appropriate for an object to be drawn.

It is another object of this invention to obtain a higher-quality image, when drawing data is graphics data for a graphics, by realizing a dither method more appropriate for drawing of the object through selection of dither data in consideration of presence or absence of area fill in an image to be drawn using the graphics data.

According to one aspect of this invention, code indicating a type of object such as a character or a graphics is added to print data that is converted to a printer language and sent to a printer controller. Based on this configuration, the type of drawing object can be identified at the time of receiving the print data, therefore, any dither data matching the drawing object can be selected. Thus, the dither method matching the drawing object is realized.

Further, when drawing data created by a host computer is to be printed, the data for the type of drawing object is added to print data that is sent from a printer driver to a printer controller. Therefore, an object determination unit of the controller determines the drawing object of the print data for each print data, selects dither data matching the drawing object, executes the dither method to the object, and expands image data. Thus, the dither method appropriate for each type of objects such as a character, a photograph, or a graphics can be realized.

Further, by adding code to identify a drawing object such as a character, a photograph, or a graphics to print data, it is possible to use dither data appropriate for the type of drawing object at the time of printing.

Further, a printer driver can add information for area fill to print data. Therefore, a printer control unit can determine whether there is area fill in a graphics image to be drawn using graphics data based on the information for area fill. Then the printer driver then selects dither data based on the information for a drawing object and the information for area fill. Thus, it is possible to select dither data most appropriate for drawing a graphics using the graphics data regardless of presence or absence of area fill.

Further, when drawing data is CAD data, information indicating the data created based on the CAD data can be added to print data. Therefore, a printer control unit can recognize that the print data is created based on the CAD data, and execute processing to this print data using CAD dither data dedicated to the CAD data.

According to another aspect of this invention, code indicating the type of object such as a character or a graphics is added to print data that is converted to a printer language and is sent. Based on this method, the type of drawing object can be identified at the time of receiving the print data. Therefore, any dither data appropriate for the drawing object can be selected. Thus, the dither method matching the drawing object is realized.

Further, when drawing data created by a host computer is to be printed, data for the type of drawing object is added to print data that is sent from a printer driver to a printer controller. Therefore, the drawing object of the print data is determined in an object determining step for each PDL command, dither data matching the drawing object is selected in a dither data outputting step, a dither method is executed to the object and then image data is expanded in a drawing processing step. Thus, the dither method appropriate for the drawing object such as a character, a photograph, or a graphics is realized.

Further, by adding code to identify character data, photograph data, or graphics data to print data, it is possible to use dither data appropriate for the type of drawing object at the time of printing.

Further, information for area fill can be added to print data. Therefore, it can be determined based on the information for area fill whether there is area fill in a graphics image to be drawn using graphics data. Dither data is then selected based on the information for area fill together with the information for a drawing object. Thus, it is possible to select dither data most appropriate for drawing a graphics using the graphics data regardless of presence or absence of area fill.

Further, when drawing data is CAD data, information indicating the data created based on the CAD data can be added to print data. Therefore, in a drawing processing step, it can be recognized that the print data is created based on the CAD data and this print data can be processed using CAD dither data dedicated to the CAD data.

According to still another aspect of this invention, the operation of image processing according to the invention can be realized by a computer by recording a program for making the computer execute the image processing method according to the invention in a recording medium.

Other objects and features of this invention will become understood from the following description with reference to the accompanying drawings.

DESCRIPTION OF THE PREFERRED EMBODIMENTS

A first embodiment and a second embodiment of the printer system and the image processing method according to the present invention are explained in detail below with reference to the attached drawings.

Figure 1:
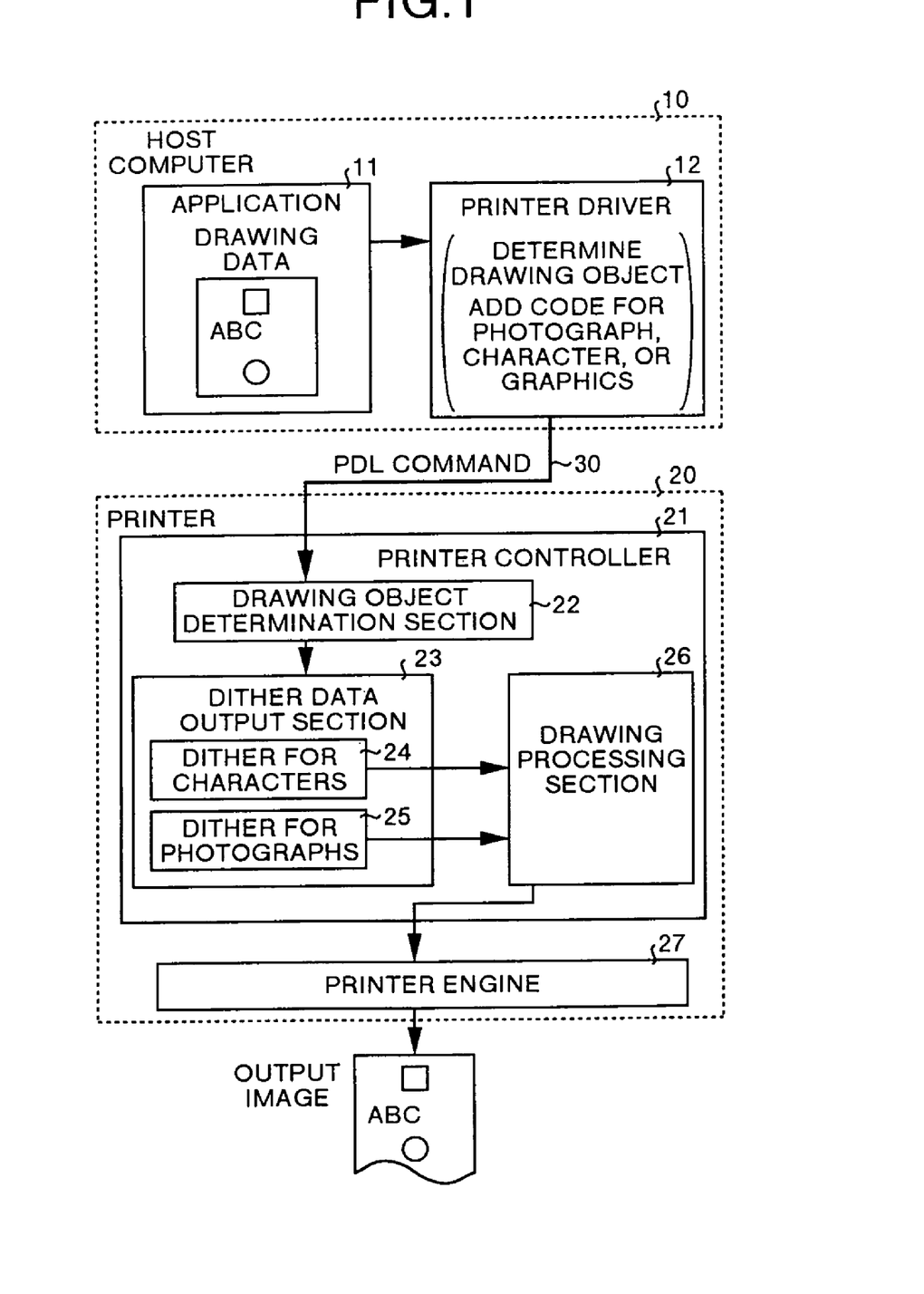
FIG. 1 is a block diagram showing a schematic configuration of a printer system according to a first embodiment of the present invention.

FIG. 1 is a block diagram showing a schematic configuration of a printer system according to a first embodiment of the present invention. The printer system is formed broadly with a host computer 10 such as a personal computer or a work station and a printer 20 as a page printer represented by a laser printer, that are connected to each other by a communication cable 30. As the communication cable 30, a bidirectional communication cable using an interface based on IEEE 1284 standards is used, through which respective interfaces (connector part) of the host computer 10 and the printer 20 are connected to each other.

The host computer 10 comprises an application 11 that opens document information or a stored file to execute processing as required, and a printer driver 12 that creates print data that the printer can interpret based on instructions of the application 11 and sends the data to the printer via the communication cable 30. The print data to be explained in the first embodiment includes a page description language (PDL: e.g., PostScript by Adobe Systems of USA) as a printer language and commands that control the print based on the page description language. Such print data is also described a PDL command in this specification.

The printer driver 12 determines the type of drawing object (e.g., characters, photographs, and graphics) of the drawing data at the time of creating print data. The printer driver 12 then adds type code indicating the type of drawing object to each drawing object sent from the application 11.

On the other hand, the printer 20 comprises a printer controller 21 that converts the print data output from the printer driver 12 to video data and outputs the video data. The printer 20 further comprises a printer engine 27 that is configured based on an electronic photographing process and a laser-write-in method, performs optical writing according to the print data sent from the printer controller 21 onto a photoconductor to form a latent image, further forms a toner image by development, and transfers the image onto the fed recording paper.

The printer controller 21 comprises a drawing object determination section 22 that determines the type of drawing data based on the type code of the object included in the print data sent from the printer driver 12. The printer controller 21 further comprises a dither data output section 23 that selects dither data for characters 24 or dither data for photographs 25 based on the result of determination in the drawing object determination section 22 to output the data. The printer controller 21 also comprises a drawing processing section 26 that creates print data using the dither data output from the dither data output section 23 to output the created data to a printer engine 27.

The dither data for characters 24 is set so as to improve reproductivity of thin lines as explained above, whereas the dither data for photographs 25 is data for a dither matrix that is set so as to reproduce changes in color densities (gradations) as naturally as possible and is stored in an area of memory provided, yet not shown, in the dither data output section 23.

The system configured as explained above basically operates as follows. When the application 11 is started, the host computer 10 opens the image information created on the host computer 10 or captured from the outside. The opened image information is subjected to processing such as editing as required.

In the first embodiment, an operator manipulates the application 11 to an instruction for printing the image information to the computer. Based on this instruction, the image information is transmitted to the printer driver 12 as drawing data. The drawing data includes a command (e.g., a GDI command in Windows) to execute drawing based on the drawing data. The commands have different information for each type of drawing objects, respectively.

The printer driver 12 converts the drawing data sent from the application 11 to a page description language so that the printer 20 can interpret the data. The printer driver 12 also determines whether the drawing object of the drawing data is a photograph, a character, or a graphics from the command included in the drawing data. The printer driver 12 then creates print data (described PDL command in the figure) based on the drawing data that has been converted to the page description language, and adds type code indicating the type of drawing object to the print data. The print data is sent to the printer controller 21 of the printer 20 via the communication cable 30. In the printer controller 21, the drawing object determination section 22 determines the drawing object of the print data from the type code of the print data sent from the printer driver 12.

The information concerning the determination on the drawing object is input to the dither data output section 23. The dither data output section 23 selects either one of the dither data for characters 24 and the dither data for photographs 25 from the input information, and outputs the selected data to the drawing processing section 26. The drawing processing section 26 interprets the page description language and performs dithering on the language using the selected dither pattern. The print data subjected to dithering is expanded in page memory or the like, that is not shown, of the drawing processing section 26 to form image data for printing. The image data for printing is output to the printer engine 27 and is output from the printer 20 as an image.

Figure 2:
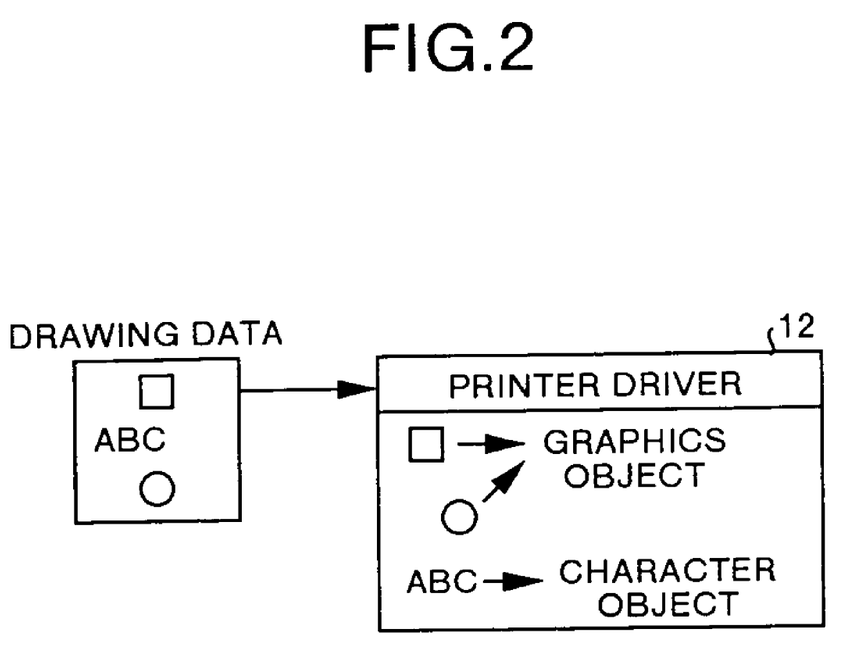
FIG. 2 shows an example of drawing data divided by a printer driver of the first embodiment.
Figure 3:
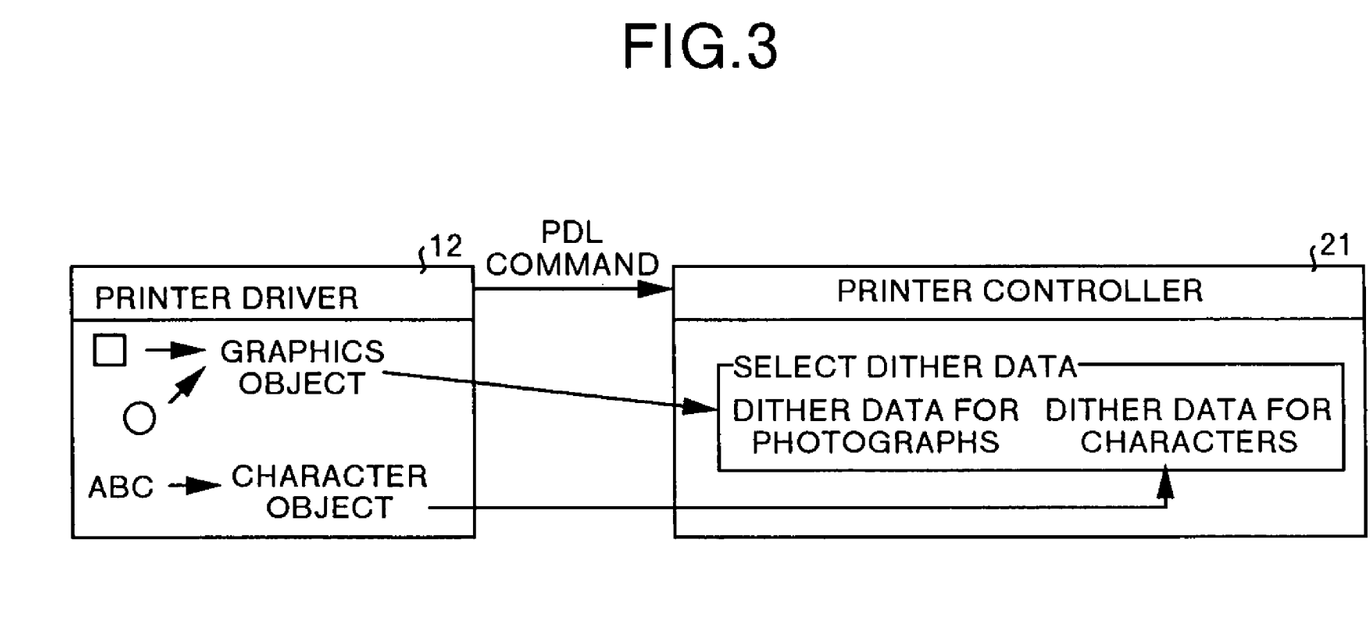
FIG. 3 shows a flow of drawing data from the printer driver to a printer controller and also shows an example of selecting dither data in the first embodiment.
Figure 4:
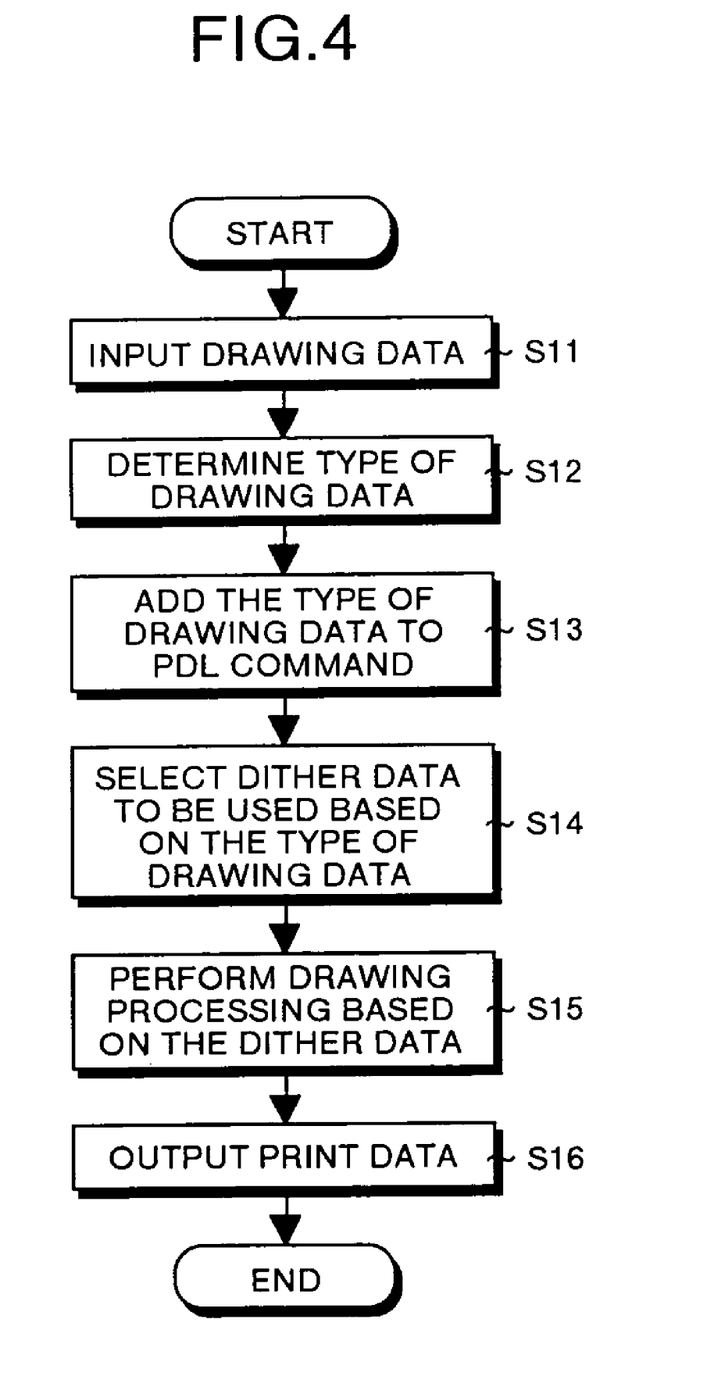
FIG. 4 is a flow chart showing an example of printing the drawing data in the first embodiment.

The operation as the characteristic of the present invention is explained below with reference to FIG. 2 to FIG. 4. FIG. 2 shows an example of drawing data divided by the printer driver 12. FIG. 3 shows a flow of drawing data from the printer driver 12 to the printer controller 21 and also shows an example of selecting dither data. FIG. 4 is a flow chart showing an example of printing the drawing data in this system.

In the flow chart shown in FIG. 4, the application 11 inputs drawing data to the printer driver 12 as shown in FIG. 2 (step S11). The printer driver 12 determines whether the drawing data input from the application 11 is a graphics as a drawing object (graphics object: the rectangle or the circle in FIG. 2) or a character as a drawing object (character object: ABC in FIG. 2) (step S12). The printer driver 12 then adds type code to identify one of these drawing objects to the print data (PDL command) that is output to the printer controller 21 (step S13).

Namely, the printer driver 12 determines what the drawing data input from the application 11 is and identifies the drawing object of the drawing data. By adding type code indicating a drawing object to print data that is output to the printer controller 21, it is programmed that the printer controller 21 can determine the type of object to be drawn (e.g., type code is added to print data each time different type code is selected).

The printer controller 21 decides the dither data to be used for the object from the type code added to the print data sent from the printer driver 12 (step S14).

At step S14, as shown in FIG. 3, when the print data is a graphics object, the printer controller 21 selects the dither data for photographs 25, and selects the dither data for characters 24 when the print data is a character object.

Further, when the print data is a photograph object, the printer controller 21 selects the dither data for photographs 25 (not shown in the figure).

The selected dither data is input from the dither data output section 23 to the drawing processing section 26. The drawing processing section 26 executes image processing including dithering on the print data using the input dither data (step S15). The print data obtained through the image processing is output to the printer engine 27 (step S16).

Namely, in the printer system of the first embodiment, the type of drawing object decided in the printer driver 12 is added to the print data. Therefore, the printer controller 21 can identify the drawing object from the print data and also select the dither data to be used as appropriate one. Thus, even when various types of drawing objects exist together within a page, dither data to be used for drawing can be reselected for each object. Further, it is possible to perform drawing processing on each of the drawing objects using dither data optimal to each of the respective drawing objects.

A second embodiment of this invention is explained below. The second embodiment is realized based on the printer system of the first embodiment by further adding information for area fill, that indicates presence or absence of area fill in an image to be drawn, to print data when drawing data with a graphics as an object is converted to the print data. The printer then selects dither data based on the information for area fill together with the type code indicating the type of object.

Figure 5:
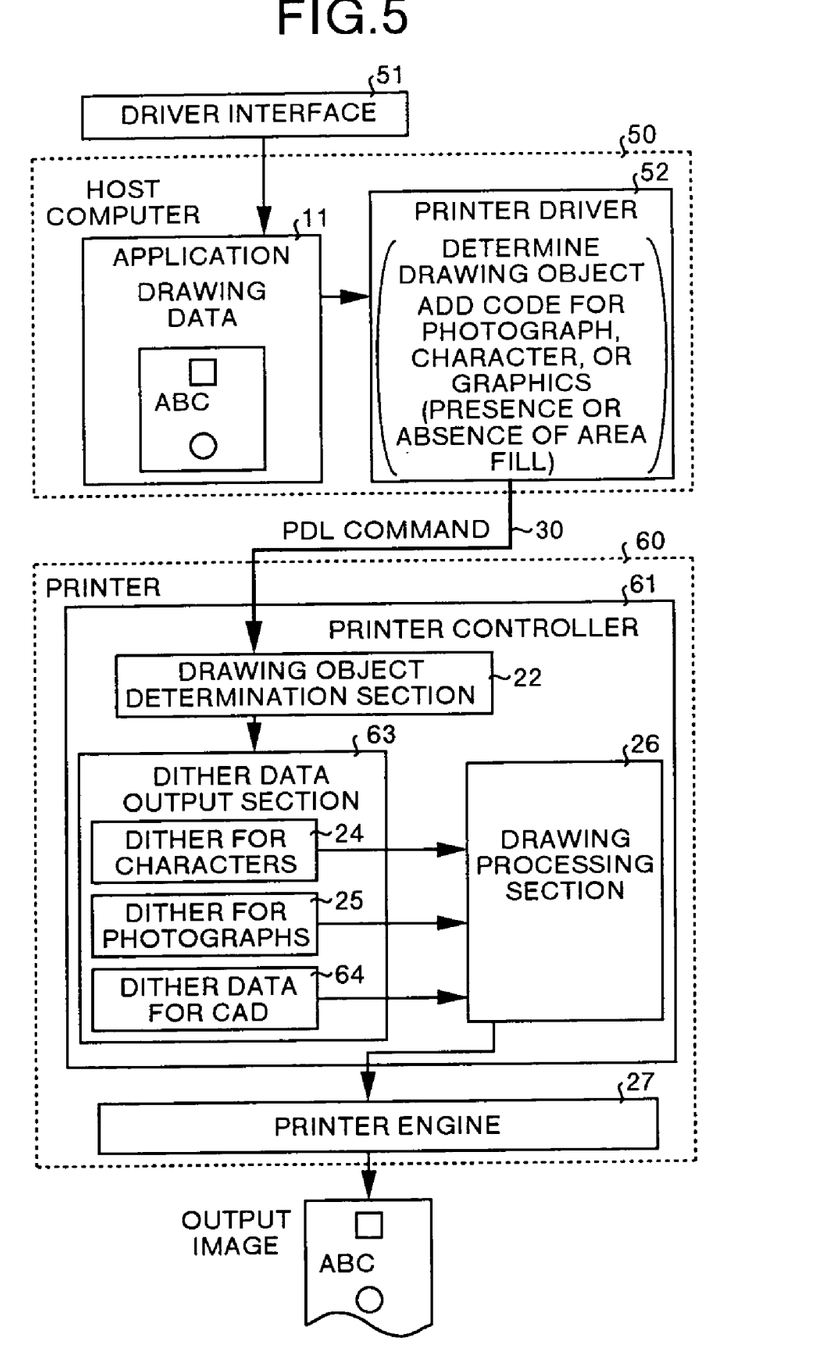
FIG. 5 is a block diagram showing a schematic configuration of a printer system according to a second embodiment of the present invention.

FIG. 5 is a block diagram showing a schematic configuration of a printer system according to a second embodiment of the present invention. The printer system shown in FIG. 5 includes the same configuration as that of the printer system of the first embodiment explained in FIG. 1. Therefore, the same reference numerals are assigned to the same configuration as that of the first embodiment, and explanation of the system is partially omitted.

The printer system shown in FIG. 5 has a host computer 50 and a printer 60 which are connected by the communication cable 30. The host computer 50 comprises the application 11 and a printer driver 52. The printer driver 52 has a function of determining a drawing object and a function of adding type code indicating the type of object such as a photograph, a character, and a graphics to data.

The printer driver 52 of the second embodiment also has functions of determining whether there is area fill in an image to be drawn based on graphics data, and adding area-fill code indicating presence or absence of area fill to print data.

In the printer system of the second embodiment, the host computer 50 is connected to a driver interface 51 through which an operator can enter an instruction to the printer driver 52.

On the other hand, the printer 60 comprises a printer controller 61, and the printer engine 27 that forms an image based on the print data sent from the printer controller 61.

The printer controller 61 comprises the drawing object determination section 22, the drawing processing section 26, a dither data output section 63, and the printer engine 27. The dither data output section 63 stores dither data for CAD 64 in addition to the dither data for characters 24 and the dither data for photographs 25.

The dither data for CAD 64 is set so as to enable higher-precision reproductivity of gradations in thin lines and colors as compared to the dither data for characters 24 and the dither data for photographs 25. The dither data for CAD 64 is previously stored in an area of memory that is provided, yet not shown, in the dither data output section 63 as are the dither data for characters 24 and the dither data for photographs 25.

The system configured as explained above basically operates as follows. When the application 11 is started, the host computer 50 opens image information. The image information is then transmitted to the printer driver 52 as drawing data.

The printer driver 52 converts the drawing data sent from the application 11 to the page description language to create print data, and also determines the drawing object of the drawing data. The printer driver 52 then adds type code indicating the type of drawing object to the print data.

When the drawing data is graphics data, the printer driver 52 for the printer system of the second embodiment determines whether there is area fill in an image to be drawn on the basis of the graphics data. The printer driver 52 then adds area-fill code indicating presence or absence of a drawing to the print data together with the type code.

The print data (described PDL command in the figure) is sent to the printer controller 61 of the printer 60 via the communication cable 30. In the printer controller 61, the drawing object determination section 22 determines the drawing object from the type code added to the print data. Further, when the print data is graphics data, the drawing object determination section 22 determines whether there is area fill based on the area-fill code. The drawing object determination section 22 then inputs the information on the result of determination to the dither data output section 63.

The dither data output section 63 determines what the drawing object of the print data is and whether there is area fill in an image based on the input information. When the print data is character data, the dither data output section 63 selects the dither data for characters 24, and selects the dither data for photograph 25 when the print data is photographic data. Further, when the print data is graphics data and there is area fill in the data, the dither data output section 63 selects the dither data for photographs 25 in order to draw the area to be filled. In this case, when there is a portion to be drawn as a line drawing in the graphics data, the dither data output section 63 selects the dither data for characters 24 as well in order to draw the line drawing portion.

When the print data is graphics data and there is no area fill in the data, the dither data output section 63 selects the dither data for characters 24. Any of the selected dither data is output to the drawing processing section 26.

Further, in the printer system of the second embodiment, when drawing is executed on the basis of CAD data created by the CAD application, the operator inputs the information to the effect that the drawing data is CAD data to the printer driver 52 via the driver interface 51. Based on this information, the printer driver 52 adds the type code indicating CAD data to the print data and inputs the data to the printer controller 61.

When the print data with the type code indicating CAD data is received, the printer controller 61 enters the information indicating that the print data is created based on the CAD data to the dither data output section 63. In this case, the dither data output section 63 selects the dither data for CAD 64 to output the data to the drawing processing section 26.

The drawing processing section 26 interprets the page description language and performs dithering on the data using the selected dither pattern. The print data subjected to dithering is expanded in page memory, not shown, of the drawing processing section 26 to form image data for printing. The image data for printing is output to the printer engine 27 and then output from the printer 60 as an image.

Figure 6:
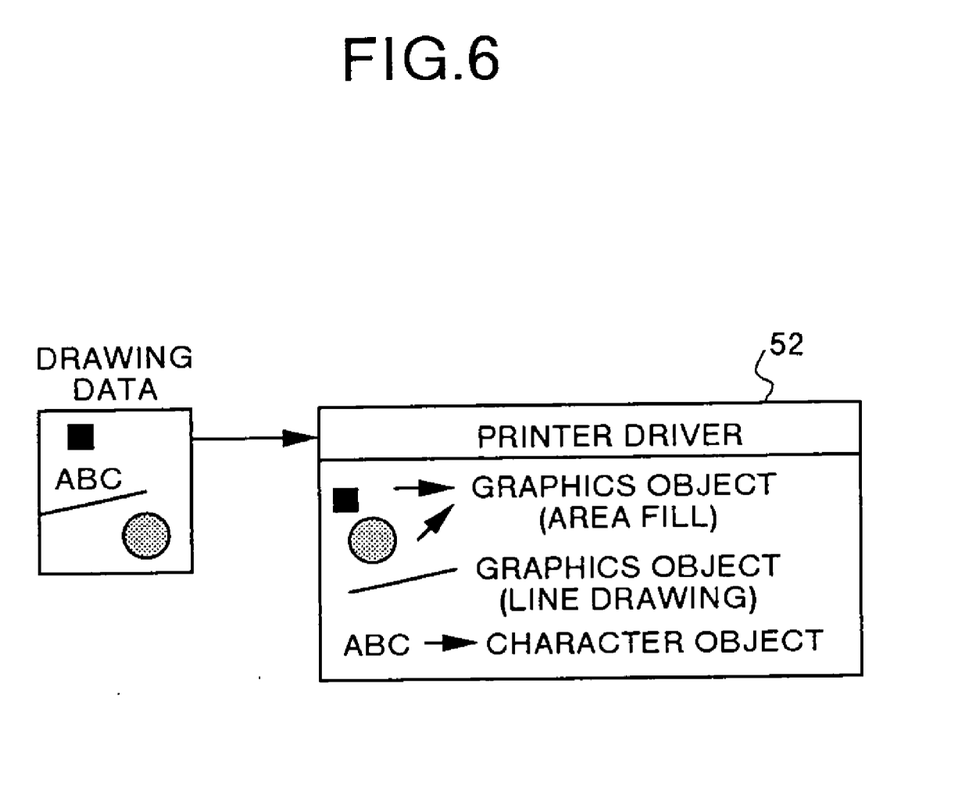
FIG. 6 shows an example of drawing data divided by a printer driver of the first embodiment.
Figure 7:
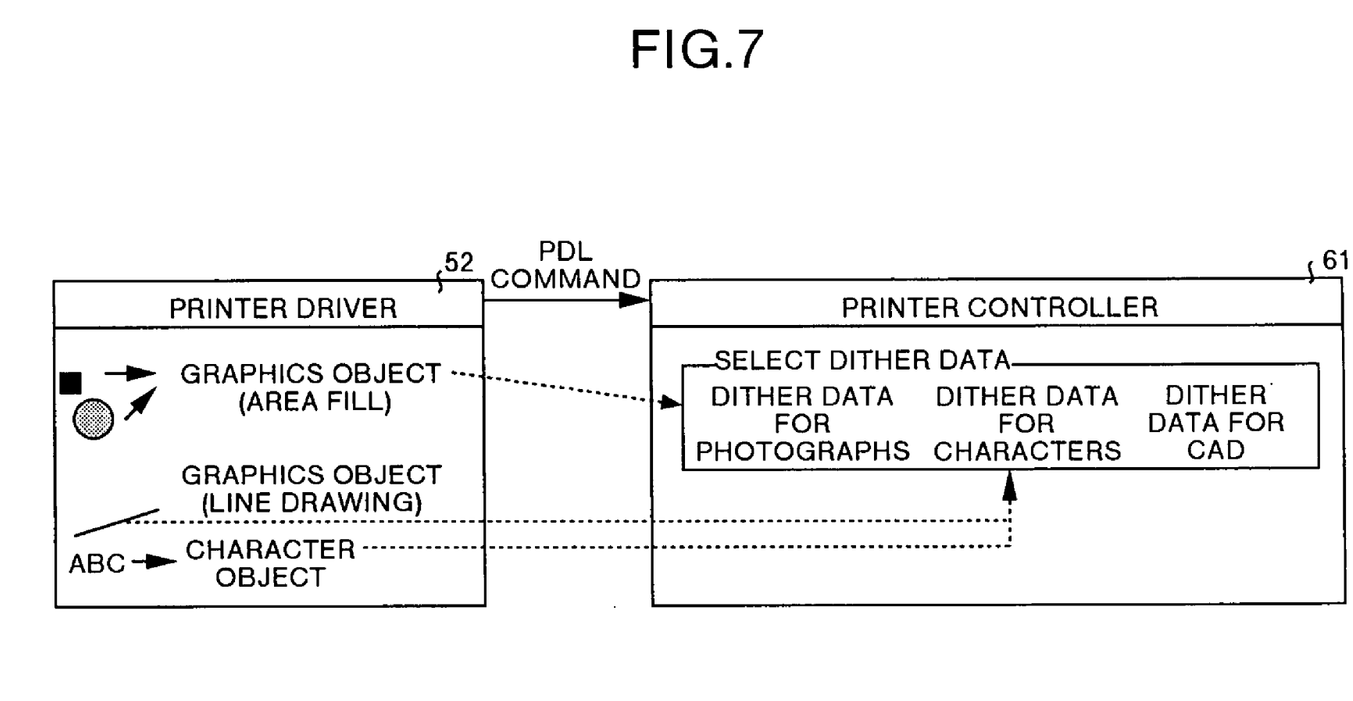
FIG. 7 shows a drawing data flow from the printer driver to a printer controller and also shows an example of selecting dither data in the second embodiment.
Figure 8:
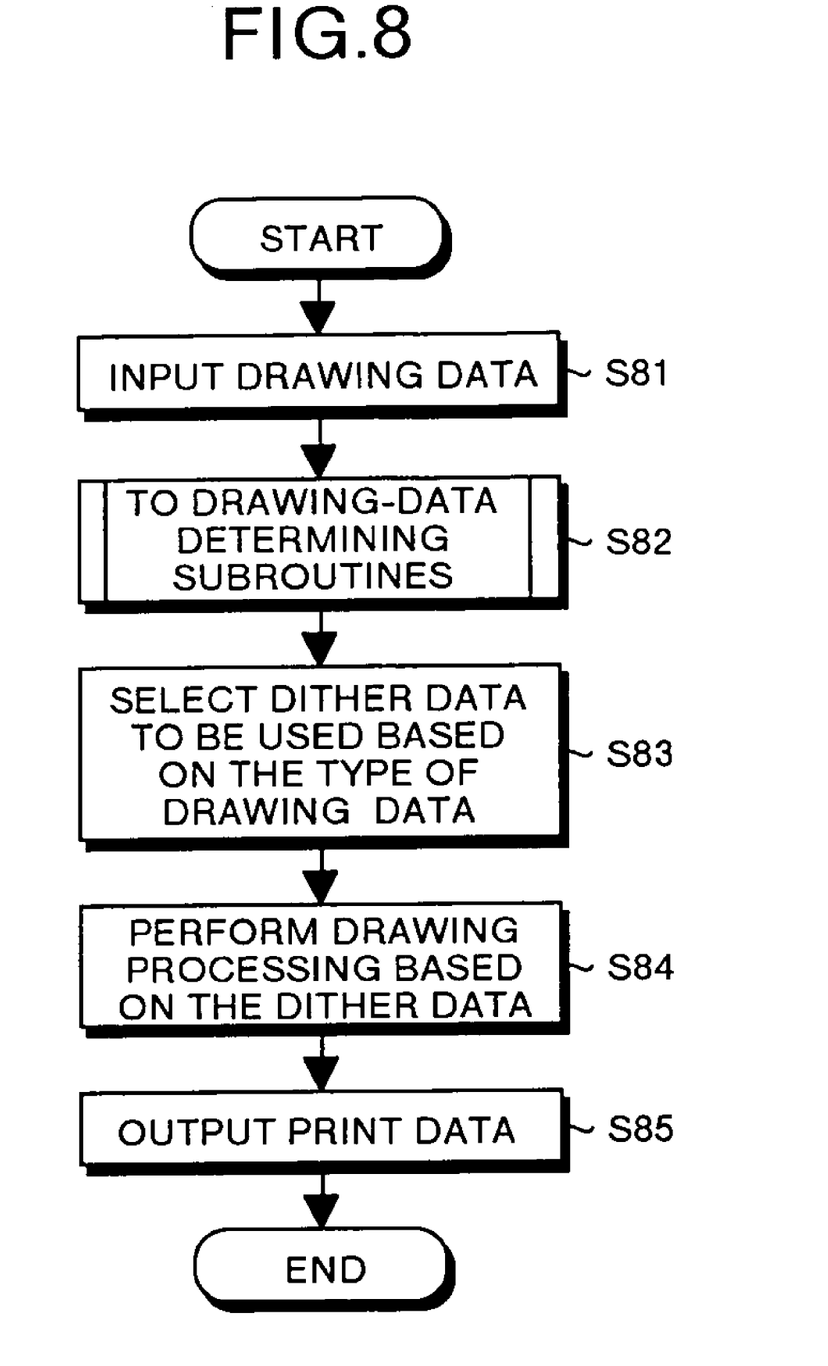
FIG. 8 is a flow chart showing an example of printing drawing data in the second embodiment.
Figure 9:
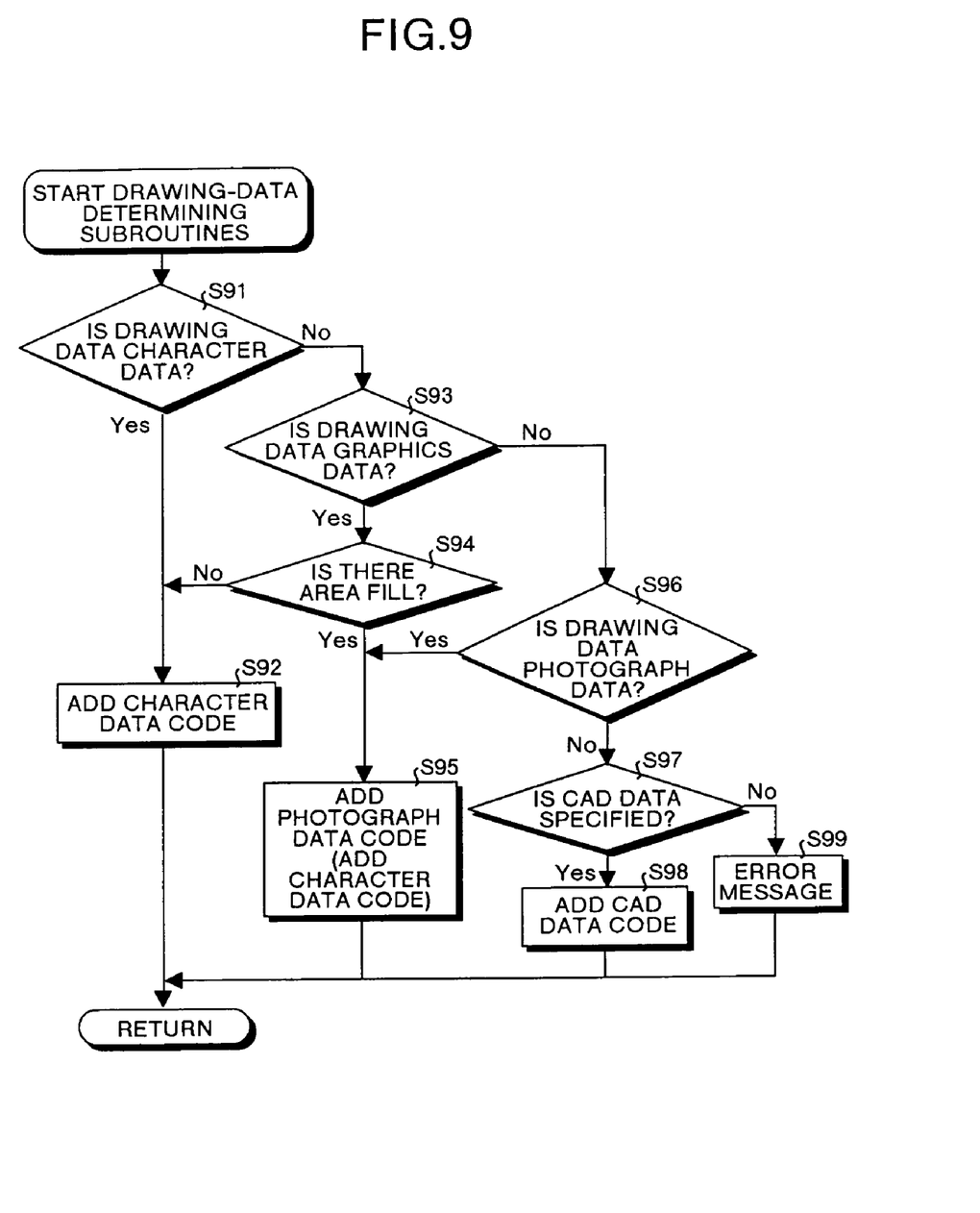
FIG. 9 shows subroutines of the flow chart shown in FIG. 8.

The operation as the characteristic of this invention is explained below with reference to FIG. 6 to FIG. 9. FIG. 6 shows an example of drawing data divided by the printer driver 52. FIG. 7 shows a drawing data flow from the printer driver 52 to the printer controller 61 and also shows an example of selecting dither data. FIG. 8 and FIG. 9 show flow charts showing an example of printing drawing data in this system.

In the flow chart shown in FIG. 8, the application 11 inputs the drawing data shown in FIG. 6 into the printer driver 52 (step S81). The printer driver 52 enters into drawing-data determining subroutines, and determines what is the drawing object of the drawing data, whether there is area fill, and further whether the data is CAD data (step S82).

FIG. 9 is a flow chart of the drawing-data determining subroutines. In the flow chart shown in FIG. 9, the printer driver 52 determines whether the drawing data is character data step S91). When the drawing data is character data (step S91: Yes) as a result of determination, the printer driver 52 determines that the drawing data is a character object (ABS in FIG. 6), and then adds character data code as type code to the print data based on the drawing data (step S92).

When the drawing data is not character data based on the determination at step 91 (step S91: No), the printer driver 52 determines whether the drawing data is graphics data (step S93). When the drawing data is graphics data (step S93: Yes), the printer driver 52 determines that the drawing data is a graphics object.

In the second embodiment, the printer driver 52 further determines whether this drawing data is created for drawing an image with area fill (shown as the graphics object (area fill) in FIG. 6) or for drawing an image with no area fill (shown as the graphics object (line drawing) in FIG. 6) (step S94).

When there is no area fill in the image as a result of determination at step S94 (step S94: No), the printer driver 52 adds a character data code as type code to the print data based on the drawing data (step S92). On the other hand, when there is area fill in the image as a result of determination at step S94 (step S94: Yes), a photograph data code as type code is added to the print data based on the drawing data (step S95). In this case, when there exist area fill and a line drawing together in the image (the graphics object (area fill) in FIG. 6), the character data code is also added to the print data together with the photograph data code.

When the drawing data is not graphics data as a result of determination at step S93 (step S93: No), the printer driver 52 determines whether the drawing data is photograph data (step S96). When it is determined that the drawing data is photograph data (step S96: Yes), a photograph data code as type code is added to the print data based on the drawing data (step S95).

When the drawing data is not photograph data as a result of determination at step S96 (step S96: No), the printer driver 52 determines whether the drawing data is specified to be processed as CAD data by the driver interface 51 (step S97). When the data is thus specified as a result of determination (step S97: Yes), a CAD data code as type code is added to the print data based on the drawing data (step S98).

On the other hand, when it is determined at step S97 that the drawing data is not specified as CAD data (step S97: No), the drawing data can not be processed based on any of the dither data provided by the printer system. Therefore, an error message appears (step S99). When all the process exits, the drawing-data determining subroutine shown in FIG. 9 returns to the flow chart in FIG. 8.

The printer controller 61 selects the dither data to be used for the object based on the type code added to the print data sent from the printer driver 52 (step S83).

At step S83, when the print data is a character object as shown in FIG. 7, the printer controller 61 selects the dither data for characters 24. When the print data is photograph data, the printer controller 61 selects the dither data for photographs 25 (not shown).

Further, when the print data is a graphics object with area fill, the printer controller 61 selects the dither data for photographs 25. In this case, when there is any portion to be drawn as a line drawing together with area fill in the data, the dither data for characters 24 is also selected together with the dither data for photographs 25. When the print data is a graphics object with no area fill, the printer controller 61 selects the dither data for characters 24. Further, when the CAD data code is added to the print data, the printer controller 61 selects the dither data for CAD 64 (not shown).

The selected dither data is input from the dither data output section 63 to the drawing processing section 26. The drawing processing section 26 executes the image processing including the dither method on the print data using the input dither data (step S84). The print data obtained by being subjected to the image processing is output to the printer engine 27 (step S85).

Namely, in the printer system of the second embodiment, the data, that indicates presence or absence of area fill in an image to be drawn based on graphics data, is added to the print data. Therefore, the printer controller 61 can specify, from the print data, whether there is area fill in an image to be drawn based on graphics data. Drawing processing is then performed using respective dither data matching an image with area fill or an image with no area fill, thus an image with higher quality can be formed.

The printer system of the second embodiment allows the effects as explained above to be obtained using only the dither data for characters and the dither data for photographs that are the dither data provided in any ordinary printer system. Therefore, the printer system of the second embodiment does not require any new dither data to be added, thus upsizing and high cost of the printer system can also be suppressed.

The present invention is not limited by the embodiments. Namely, in the embodiments, the system configurations shown in FIG. 1 and FIG. 5 have been explained. However, this invention is applicable not only to such system configuration but also to any system constructed by a personal computer (PC) or a work station (WS) and a printer having an interface function with these computer equipment, that are connected to each other indirectly via a network such as another system, the Internet or an intranet, or directly via a printer server.

Further, the image processing method as explained above can be programmed and recorded in a computer-readable recording medium to be executed on a computer. A part of the image processing method may be connected to a network, thus it is also possible to realize the method over a communication cable.

Namely, the image processing methods explained in the first embodiment and the second embodiment are realized by executing a prepared program by a computer (CPU) such as a personal computer or a work station. Through operation of a keyboard or the like, this program is recorded in a computer-readable recording medium such as memory, a hard disk, a floppy disk, a CD-ROM, an MO, or a DVD, and is executed by being read out from the recording medium by the computer (CPU). Further, the process data for this image processing can be transmitted to an external device from a communication device as necessary. This program can also be distributed to any device such as a personal computer over a network such as the Internet via the recording medium.

As explained above, according to one aspect of this invention, when the data created by the host computer is transmitted to the printer for printing, the code indicating the type of object can be added to print data that is converted to a printer language and sent to the printer controller. In accordance with this configuration, the type of drawing object can be identified at the time of receiving the data, whereas, the conventional controller selects dither data by page or in each different image quality mode. Any dither data matching the drawing object can be selected and processed. Thus, by executing the dither method using the dither data for photographs for a graphics object and the dither data for characters for a character object, dither data inappropriate for the drawing object is no longer used. Therefore, it is possible to avoid degradation in image quality due to inappropriate usage of dither data.

Further, when the drawing data created by the host computer is to be printed, the data for the type of drawing object can be added to print data that is sent from the printer driver to the printer controller. Therefore, the object determination unit of the controller can determine the drawing object of the print data for each print data and then select dither data matching the drawing object. By performing dithering on the object using the dither data for the object and expanding image data, determination of the object and selection of the dither data can comparatively easily be performed in the printer side. The dither method appropriate for each type of objects such as a character and a graphics can be realized, therefore, the usage of dither data inappropriate for the drawing object can be eliminated. Thus, it is possible to avoid degradation in image quality due to inappropriate usage of dither data.

Further, the code to identify a drawing object such as a character, a photograph, or a graphics can be added to print data. Therefore, when the object is to be printed, it is possible to select dither data appropriate for the type of drawing object and perform dithering optimal to the drawing object. Thus, the quality of an image in which the corresponding drawing object is drawn is enhanced.

Further, the information for area fill is added to print data, therefore, whether there is area fill in a graphics image to be drawn by graphics data can be determined from the information for area fill. Dither data is then selected based on the information for area fill together with the information for a drawing object, thus, it is possible to select dither data most appropriate for drawing a graphics using the graphics data regardless of presence or absence of area fill. Therefore, the drawing processing optimal to the graphics data can be performed regardless of presence or absence of area fill, thus an image with higher quality can be formed.

Further, when drawing data is CAD data, the information indicating the data created based on the CAD data can be added to print data. The printer control unit then recognizes that the print data is created based on the CAD data and can execute processing to this print data using CAD dither data dedicated to the CAD data. Therefore, it is possible to provide a printer system also compatible with CAD data which requires to form particularly high quality of image.

According to another aspect of this invention, when the data created by the host computer is sent to the printer for printing, the code indicating the type of object can be added to print data that is converted to a printer language and sent to a printer controller. In accordance with this method, the type of drawing object can be identified at the time of receiving the data, whereas, according to the conventional method, dither data is selected by page or in each different image quality mode in the controller side. By selecting the dither data appropriate for the drawing object to be used for processing and executing the dither method using the dither data for photographs for a graphics object or the dither data for characters for a character object on the data, dither data inappropriate for the drawing object is no longer used. Thus, it is possible to avoid degradation in image quality due to inappropriate usage of dither data.

Further, when drawing data created by the host computer is to be printed, the data for the type of drawing object can be added to print data that is sent from the printer driver to the printer controller. Therefore, the drawing object of the print data can be determined for each print data and the dither data matching the drawing object can be selected in the drawing object determining step. By executing the dither method using the dither data for this object to expand image data, determination of the object and selection of the dither data can comparatively easily be performed in the printer side. Respective dither method appropriate for each type of objects such as a character and a graphics can be realized. Therefore, dither data inappropriate for the drawing object is no longer used. Thus, it is possible to avoid degradation in image quality due to inappropriate usage of dither data.

Further, the code to identify a drawing object such as a character, a photograph, or a graphics can be added to print data. Therefore, it is possible to select the dither data appropriate for the type of drawing object at the time of printing and perform dithering optimal to the drawing object. Thus, the quality of an image in which the corresponding object is drawn is enhanced.

Further, the information for area fill can be added to print data. Therefore, it can be determined from the information for area fill whether there is area fill in a graphics image to be drawn based on graphics data. Dither data can be then selected based on the information for area fill together with the information for a drawing object. Thus, it is possible to select the dither data most appropriate for drawing a graphics using the graphics data regardless of presence or absence of area fill. Therefore, it is possible to perform drawing processing most appropriate for the graphics data regardless of presence or absence of area fill, thus an image with higher quality can be formed.

Further, when drawing data is CAD data, the information indicating the data created based on the CAD data can be added to print data. Therefore, it can be recognized that the print data is created based on the CAD data in the drawing processing step, and then this print data can be processed using CAD dither data dedicated to the CAD data. Thus, it is possible to provide an image processing method also compatible with CAD data which requires to form particularly high quality of image.

According to still another aspect of this invention, the operation of image processing according to the invention can be realized by a computer by recording the program for making the computer execute the image processing method according to the invention in a recording medium.

The present document incorporates by reference the entire contents of Japanese priority documents, 11-152908 filed in Japan on May 31, 1999 and 2000-132931 filed in Japan on May 1, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A printer system which inputs drawing data defining a drawing object created or edited by an application on a host computer, converts the drawing data defining the drawing object to a printer language to create print data, and also outputs the image drawn based on the print data from a printer, said printer system comprising:
a printer driver configured to add information separate from the converted drawing data to the print data to identify each type of drawing object and, when the drawing object is graphics data, also adds area fill information; and
a printer control unit configured to select dither data based on the information added by the printer driver identifying the particular type of drawing object and to execute a dither method based on the selected dither data to form the image drawn.

2. The printer system according to claim 1, wherein said printer control unit comprises:
an object determination unit configured to determine a drawing object of the print data based on the information added by the printer driver identifying the particular type of drawing object;
a dither data output unit configured to select dither data matching the drawing object determined by said object determination unit to output the selected dither data; and
a drawing processing unit which executes a dither method on the print data using the selected dither data output from said dither data output unit to expand the print data to an image.

3. The printer system according to claim 1, wherein the drawing object includes at least one of character data and photograph data, in addition to graphics data.

4. The printer system according to claim 1, wherein, when the drawing object is graphics data and the information added by the printer driver to the print data indicates the drawing object is graphics data with no area fill, said printer control unit selects dither data appropriate for the graphics data with no area fill.

5. The printer according to claim 1, wherein, when the drawing data is CAD data created by a CAD (Computer Aided Design) application, the information added by said printer driver to the print data further indicates that the drawing data is the CAD data, and said printer control unit performs processing on the print data using CAD dither data dedicated to the CAD drawing data.

6. An image processing method for converting drawing data defining a drawing object created or edited by an application on a host computer to a printer language to create print data, and also outputting an image drawn based on the print data from a printer, said image processing method comprising:
a drawing object adding step of adding information separate from the converted drawing data to the print data to identify each type of drawing object represented by the print data and, when the drawing object is graphics data, also adding area fill information; and
a drawing processing step of selecting dither data based on the drawing-object identifying information separate from the converted drawing data added to the print data and executing a dither method based on the selected dither data to output the image drawn.

7. The image processing method according to claim 6, wherein the drawing processing step comprises:
an object determining step of determining a drawing object of the print data based on the drawing-object identifying information added to the print data;
a dither data outputting step of selecting dither data matching the drawing object determined in the object determining step to output the selected dither data; and
a dithering step of executing a dither method on the print data using the selected dither data output in the dither data outputting step to expand the print data to an image.

8. The image processing method according to claim 6, wherein the drawing object includes at least one of a character data and a photograph data, in addition to graphics data.

9. The image processing method according to claim 6, wherein, when the identifying information added in the drawing object adding step to the print data indicates the drawing object is graphics data and the added area fill information indicates there is no area fill, the drawing processing step includes selecting dither data appropriate for the graphics data with no area fill.

10. The image processing method according to claim 6, the method further comprising a CAD information adding step of adding information indicating CAD data is to be printed to the print data as part of the identifying information when the drawing data is CAD data created by a CAD (Computer Aided Design) application, wherein the print data is processed using CAD dither data dedicated to the CAD data in the drawing processing step.

11. A computer-readable recording medium in which a program for making a computer execute an image processing method for converting drawing data defining a drawing object created or edited by an application on a host computer to a printer language to create print data, and also outputting an image drawn based on the print data from a printer, is recorded, said image processing method comprising:
a drawing object adding step of adding information separate from the converted drawing data to the print data to identify each type of drawing object represented by the print data and, when the drawing object is graphics data, also adding area fill information; and
a drawing processing step of selecting dither data based on the drawing-object identifying information separate from the converted drawing data added to the print data, and executing a dither method based on the selected dither data to output the image drawn.

12. The computer-readable recording medium according to claim 11, wherein the drawing processing step comprises:
an object determining step of determining a drawing object of the print data based on the drawing-object identifying information added to the print data;
a dither data outputting step of selecting dither data matching the drawing object determined in the object determining step to output the selected dither data; and
a dithering step of executing a dither method on the print data using the selected dither data output in the dither data outputting step to expand the print data to an image.

13. The computer-readable recording medium according to claim 11, wherein the drawing object includes at least one of a character data and a photograph data, in addition to graphics data.

14. The computer-readable recording medium according to claim 11, wherein, when the identifying information added in the drawing object adding step to the print data indicates the drawing object is graphics data and the added area fill information indicates there is no area fill, the drawing processing step includes selecting dither data appropriate for the graphics data with no area fill.

15. The computer-readable recording medium according to claim 11, the method further comprising a CAD information adding step of adding information indicating CAD data is to be printed to the print data as part of the identifying information when the drawing data is CAD data created by a CAD (Computer Aided Design) application, wherein the print data is processed using CAD dither data dedicated to the CAD data in the drawing processing step.

16. A printer configured to input drawing data defining a drawing object, to convert the drawing data defining the drawing object to a printer language to create print data, and to output an image being drawn based on the print data, said printer further comprising:
- a printer driver configured to add information separate from the converted drawing data of the print data to the print data to identify the type of drawing object as photograph data when the drawing object is graphic data with area fill.

17. The printer according to claim 16, wherein the drawing object includes at least one of character data and photograph data, in addition to graphics data.

18. The printer according to claim 16, wherein the printer driver is configured to further add information separate from the converted drawing data of the print data to the print data to identify the type of drawing object as character data when the drawing object is graphics data with no area fill.

19. A printer configured to input drawing data defining a drawing object, to convert the drawing data defining a drawing object to a printer language to create print data, and to output an image being drawn based on the print data, said printer further comprising:
- a printer control unit configured to select dither data for photograph appropriate for graphics data with area fill based on information separate from the converted drawing data of the print data added to the print data to identify the type of drawing object, and to execute a dither method based on the added information to expand the print data to an image.

20. The printer according to claim 19, wherein said printer control unit comprises:
- an object determination unit configured to determine a drawing object of the print data based on the added information;
- a dither data output unit configured to select dither data matching the drawing object determined by said object determination unit and to output the selected dither data; and
- a drawing processing unit configured to execute a dither method on the print data using the selected dither data output from said dither data output unit to expand the print data to an image.

21. The printer according to claim 19, wherein the drawing object includes at least one of character data and photograph data, in addition to graphics data.

22. The printer according to claim 16, wherein said printer control unit is further configured to select dither data for character appropriate for graphics data with no area fill based on the added information identifying the drawing object as graphics data with no area fill.

* * * * *